(12) United States Patent
Dettinger et al.

(10) Patent No.: US 7,139,774 B2
(45) Date of Patent: *Nov. 21, 2006

(54) SINGLETON ABSTRACT MODEL CORRESPONDENCE TO MULTIPLE PHYSICAL MODELS

(75) Inventors: Richard D. Dettinger, Rochester, MN (US); Cale T. Rath, Bryon, MN (US); Richard J. Stevens, Mantorville, MN (US); David A. Wall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 431 days.

This patent is subject to a terminal disclaimer.

(21) Appl. No.: 10/459,733

(22) Filed: Jun. 12, 2003

(65) Prior Publication Data

US 2004/0254939 A1 Dec. 16, 2004

(51) Int. Cl.
*G06F 17/30* (2006.01)
(52) U.S. Cl. .................. 707/103 R; 707/100; 707/101; 707/102; 707/104.1
(58) Field of Classification Search ................ 707/100, 707/101, 102, 103 R, 104.1, 200
See application file for complete search history.

(56) References Cited

U.S. PATENT DOCUMENTS 6,725,227 B1   4/2004   Li
6,883,063 B1 *  4/2005  Blumenau et al. .......... 711/113
7,054,877 B1 *  5/2006  Dettinger et al. .......... 707/101
2002/0002661 A1 * 1/2002 Blumenau et al. .......... 711/165

FOREIGN PATENT DOCUMENTS

WO   WO 9406091 A1 *  3/1994

OTHER PUBLICATIONS

Dettinger et al., IBM U.S. Appl. No. 10/083,075 (ROC920020044US1), filed Feb. 26, 2002, "Improved Application Portability and Extensibility Through Database Schema and Query Abstraction".

* cited by examiner

*Primary Examiner*—Frantz Coby
(74) *Attorney, Agent, or Firm*—Patterson & Sheridan, LLP

(57) ABSTRACT

A method, system and article of manufacture for accessing data in a database independent of the particular manner in which the data is physically represented and for providing an abstract representation of the data in the database. One embodiment provides a method of architecting a logical representation of physical data in a database comprising providing a template data abstraction model defining template logical fields, and providing, on the basis of the template data abstraction model, a logical representation of the physical data, the logical representation defining a plurality of logical fields providing an abstract view of the physical data and adapted for transforming logical fields of abstract queries into a form consistent with the physical data in the database.

32 Claims, 11 Drawing Sheets

SINGLETON ABSTRACT MODEL CORRESPONDENCE TO MULTIPLE PHYSICAL MODELS

CROSS-RELATED APPLICATION

This application is related to the following commonly owned application: U.S. patent application Ser. No. 10/083,075, filed Feb. 26, 2002, entitled "IMPROVED APPLICATION FLEXIBILITY THROUGH DATABASE SCHEMA AND QUERY ABSTRACTION", which is hereby incorporated herein in its entirety.

BACKGROUND OF THE INVENTION

1. Field of the Invention

The present invention generally relates to data processing and more particularly to providing an abstract representation for data in a database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL) in the case of a relational database. Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data in a database, and so forth.

In commonly assigned U.S. patent application Ser. No. 10/083,075 (the '075 application), filed Feb. 26, 2002 entitled "Improved Application Flexibility Through Database Schema and Query Abstraction", a framework was disclosed for logically viewing physical data. The framework of the '075 application provided a requesting entity (i.e., an end-user or application) with an abstract representation of physical data. In other words, the framework of the '075 application provided the requesting entity with an abstract data model that logically describes an underlying physical data structure. In this way, the requesting entity is decoupled from the underlying physical data to be accessed. Logical queries based on the framework can be constructed without regard for the makeup of the physical data. Further, changes to the physical data do not necessitate changes to applications accessing the physical data.

In general, when using the framework of the '075 application in a relational database environment, one abstract data model is created for each table in the relational database. Moreover, the task of creating abstract data models is typically performed by an operator or database administrator. Consequently, if the relational database comprises a large number of tables or if a large number of new tables is frequently generated for the database, this task rapidly becomes time-consuming for the operator or database administrator. In addition, in many cases a relational database may contain multiple tables with different table names and storing different physical data, but having the same physical layout or underlying data structure. For instance, assume a company that has a scientific tool that runs an experiment and stores results to a new database table each time the experiment is run. Assume further that the tool runs periodically and produces the same columns of data. In this example, the respective table names and the physical data in each table are the only differences between all generated new database tables, while all of them have similar physical data structures. Typically, for each generated database table a separate logical representation is created. In other words, if the scientific tool runs daily, each day a new logical representation is created for the newly generated database table.

Therefore, there is a need for an improved and more flexible method for architecting abstract representations for physical data in a database.

SUMMARY OF THE INVENTION

The present invention generally is directed to a method, system and article of manufacture for providing an abstract representation for data in a database and more particularly for architecting a logical representation of physical data in the database. The architecting may be embodied as an abstract framework through which the data may then be accessed independent of the particular manner in which the data is physically represented.

One embodiment of architecting a logical representation of physical data in a database comprises providing a template data abstraction model defining template logical fields, and providing, on the basis of the template data abstraction model, a logical representation of the physical data. The logical representation defines a plurality of logical fields providing an abstract view of the physical data and is adapted for transforming logical fields of abstract queries into a form consistent with the physical data in the database.

Another embodiment provides a method of architecting a relationship between a logical representation of physical data in a database and a physical representation of the physical data. The method comprises providing a plurality of databases, each database having an associated plurality of database data structures, providing a template data abstraction model defining template logical fields, each template logical field defining a generic abstract view of a set of similar database data structures, and receiving an abstract query against physical data included in one or more of the plurality of databases, the abstract query having a plurality of query logical fields for corresponding query data structures, each query logical field being generically defined by one of the template logical fields. The method further comprises, for each database of the plurality of databases, determining whether the associated plurality of database data structures of the database includes all query data structures, and, if so, the template data abstraction model is used to generate the logical representation for the physical data. The logical representation defines a plurality of logical fields providing an abstract view of the physical data and is adapted for transforming the query logical fields into a form consistent with the physical data in the database.

Still another embodiment provides a method of providing access to physical data in a database having a particular physical data representation. The method comprises providing two or more logical representations, each logical representation defining a plurality of logical fields providing an abstract view of at least one portion of the physical data, receiving an abstract query from the requesting entity, wherein the abstract query comprises a plurality of logical field definitions, and selecting, on the basis of the plurality of logical field definitions of the abstract query, one of the two or more logical representations to use in transforming the abstract query into a form consistent with the at least one portion of the physical data.

Still another embodiment provides a computer readable medium containing a program which, when executed, performs an operation of architecting a logical representation of physical data in a database. The operation comprises retrieving a template data abstraction model defining template logical fields, and generating, on the basis of the template data abstraction model, a logical representation of the physical data, the logical representation defining a plurality of logical fields providing an abstract view of the physical data and adapted for transforming logical fields of abstract queries into a form consistent with the physical data in the database.

Still another embodiment provides a computer readable medium containing a program which, when executed, performs an operation of architecting a relationship between a logical representation of physical data in a database and a physical representation of the physical data. The operation comprises retrieving a plurality of databases, each database having an associated plurality of database data structures, retrieving a template data abstraction model defining template logical fields, each template logical field defining a generic abstract view of a set of similar database data structures, and receiving an abstract query against physical data included in one or more of the plurality of databases, the abstract query having a plurality of query logical fields for corresponding query data structures, each query logical field being generically defined by one of the template logical fields. The operation further comprises, for each database of the plurality of databases, determining whether the associated plurality of database data structures of the database includes all query data structures, and, if so, the template data abstraction model is used to generate the logical representation for the physical data. The logical representation defines a plurality of logical fields providing an abstract view of the physical data and is adapted for transforming the query logical fields into a form consistent with the physical data in the database.

Still another embodiment provides a computer readable medium containing a program which, when executed, performs an operation of providing access to physical data in a database having a particular physical data representation. The operation comprises retrieving two or more logical representations, each logical representation defining a plurality of logical fields providing an abstract view of at least one portion of the physical data, receiving an abstract query from the requesting entity, wherein the abstract query comprises a plurality of logical field definitions, and selecting, on the basis of the plurality of logical field definitions of the abstract query, one of the two or more logical representations to use in transforming the abstract query into a form consistent with the at least one portion of the physical data.

Still another embodiment provides a computer comprising a database for storing data and a template processor. The template processor is configured for architecting a logical representation of physical data in a database. The architecting comprises retrieving a template data abstraction model defining template logical fields, and generating, on the basis of the template data abstraction model, a logical representation of the physical data, the logical representation defining a plurality of logical fields providing an abstract view of the physical data and adapted for transforming logical fields of abstract queries into a form consistent with the physical data in the database.

Still another embodiment provides a computer comprising a database for storing data and a template processor. The template processor is configured for architecting a relationship between a logical representation of physical data in a database and a physical representation of the physical data. The architecting comprises retrieving a plurality of databases, each database having an associated plurality of database data structures, retrieving a template data abstraction model defining template logical fields, each template logical field defining a generic abstract view of a set of similar database data structures, and receiving an abstract query against physical data included in one or more of the plurality of databases, the abstract query having a plurality of query logical fields for corresponding query data structures, each query logical field being generically defined by one of the template logical fields. The architecting further comprises, for each database of the plurality of databases, determining whether the associated plurality of database data structures of the database includes all query data structures, and, if it is determined that the associated plurality of database data structures of the database includes all query data structures, using the template data abstraction model to generate the logical representation for the physical data, the logical representation defining a plurality of logical fields providing an abstract view of the physical data and adapted for transforming the query logical fields into a form consistent with the physical data in the database.

Still another embodiment provides a computer comprising a database for storing data and a processor. The processor is configured for performing an operation of providing access to physical data in a database having a particular physical data representation. The operation comprises retrieving two or more logical representations, each logical representation defining a plurality of logical fields providing an abstract view of at least one portion of the physical data, receiving an abstract query from the requesting entity, wherein the abstract query comprises a plurality of logical field definitions, and selecting, on the basis of the plurality of logical field definitions of the abstract query, one of the two or more logical representations to use in transforming the abstract query into a form consistent with the at least one portion of the physical data.

Still another embodiment provides a data structure residing in memory and comprising a template data abstraction model being configured for generation of a logical representation for at least one portion of physical data in a database, the logical representation defining a plurality of logical fields providing an abstract view of the at least one portion of the physical data and adapted for transformation of logical fields of abstract queries into a form consistent with the at least one portion of the physical data in the database. The template data abstraction model includes a plurality of template logical fields defining a generic abstract view of the physical data in the database, each template logical field having generic data location metadata for generically representing a relationship between a specific logical field of the plurality of logical fields and a corresponding specific physical data item in the database.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
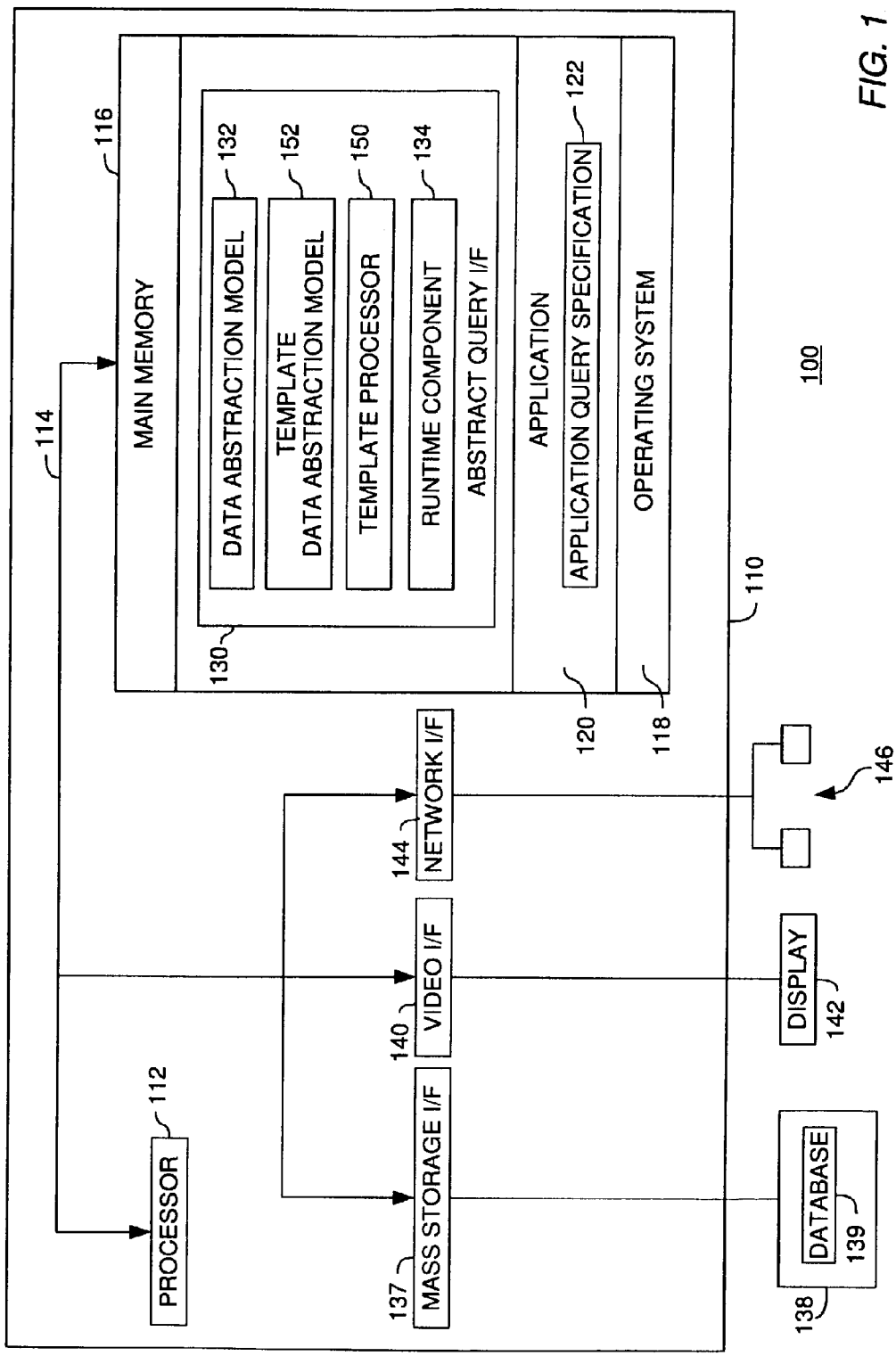
FIG. 1 is a computer system illustratively utilized in accordance with the invention.

The present invention is generally directed to a system, method and article of manufacture for providing an abstract representation of data in a database and in particular to a system, method and article of manufacture for architecting a logical representation of physical data in the database. The logical representation provides an abstract view of the physical data and is used for transforming abstract queries into a form consistent with the physical data in the database.

In order to avoid a repeated manual creation of logical representations for similar database tables, a template data abstraction model that generically defines different specific logical representations for plural similar database tables may be used to advantage. Accordingly, the template data abstraction model applies to all generated new database tables. In other words, instead of creating a separate logical representation for each instance of the database table, there is only one template data abstraction model for every table created by the scientific tool.

In one embodiment, the template data abstraction model defines template logical fields. Each template logical field may include generic data location metadata for physical data in the database. Using the template logical fields, specific logical fields defining a logical representation for a specific physical data item can be generated. The template data abstraction model can thus be processed to generate one or more specific logical representations for specific physical data items in the database.

In one embodiment, generation of a data abstraction model based on the template data abstraction model is done each time a new table is generated. In another embodiment, processing of the template data abstraction model can be deferred until runtime by implementing an algorithm that builds dynamically a new logical model that fits a new physical model or data structure that is created. In this case, a set of template logical fields of the template data abstraction model from an original template data abstraction model is dynamically arranged to create a new specific logical representation for the new underlying physical data structure. To facilitate this creation, the template data abstraction model can be provided with some kind of wildcard or schema matching logic. Thus, in one embodiment, a single template data abstraction model can be commonly applied to any table in the database that: (i) starts with a certain character string, (ii) has a matching set of columns, (iii) has a best-match set of columns, etc.

Terminology and Definitions

For clarity, the following terminology and definitions will be used to characterize features of the preferred embodiments for architecting a logical representation of physical data in a database. However, the terminology and definitions are only intended to clarify the description and to simplify the understanding thereof, but not to limit the present invention to these particular definitions:

(i) a physical entity of data (interchangeably referred to as a physical data entity) refers to a data item in an underlying database as, e.g., the data included in a database table or in a column of the database table, i.e., to the physical data itself;

(ii) a data structure refers to a physical arrangement of physical data associated with one or more physical entities of the data in the database such as, e.g., an arrangement in the form of a database table or a column of the database table;

(iii) a physical representation of data in a database refers to an organizational schema of the physical data in the database as, e.g., a relational schema, and may be composed of a plurality of data structures;

(iv) a logical field refers to an abstract view of physical data whether as an individual data item or a collection of physical data in the form of, for example, a database table;

(v) a logical representation refers to an abstract view of a physical representation of data and may be composed of a plurality of logical fields;

(vi) an abstract query refers to a query that is defined using one or more logical fields and needs to be transformed into a query consistent with the physical representation of data in a database in order to be executed against the database; and (vii) a schema generically refers to a particular arrangement/description (logical or physical) of data.

Preferred Embodiments

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Referring now to FIG. 1, a computing environment 100 is shown. In general, the distributed environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 100. Examples of the operating system 118 include IBM OS/400®, UNIX, Microsoft Windows®, and the like.

The memory 116 further includes one or more applications 120 and an abstract query interface 130. The applications 120 and the abstract query interface 130 are software products comprising a plurality of instructions that are resident at various times in various memory and storage devices in the computer system 100. When read and executed by one or more processors 112 in the computer system 100, the applications 120 and the abstract query interface 130 cause the computer system 100 to perform the steps necessary to execute steps or elements embodying the various aspects of the invention. The applications 120 (and more generally, any requesting entity, including the operating system 118) are configured to issue queries against a database 139 (shown in storage 138). The database 139 is representative of any collection of data regardless of the particular physical representation of the data. By way of illustration, the database 139 may be organized according to a relational schema (accessible by SQL queries) or according to an XML schema (accessible by XML queries). However, the invention is not limited to a particular schema and contemplates extension to schemas presently unknown. Furthermore, the database may accommodate one or more data stores or data warehouses.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") are composed using logical fields defined by the abstract query interface 130. In particular, the logical fields used in the abstract queries are defined by a data abstraction model 132 of the abstract query interface 130. The abstract queries are executed by a runtime component 134 which transforms the abstract queries into a form consistent with the physical representation of the data contained in the database 139. The data abstraction model 132 can be generated using a template processor 150 on the basis of a template data abstraction model 152, as explained in more detail below with respect to FIGS. 5A and 5B. Illustratively, the template processor 150 is shown as included in the abstract query interface 130. However, the template processor 150 may alternatively be implemented as a separate component or, still alternatively, as one of the applications 120.

In one embodiment, the abstract query interface 130 is implemented as part of a database management system (DBMS). However, the DBMS may also comprise only part of the components of the abstract query interface 130, such as the template processor 150 or the runtime component 134. The application query specification 122 and an exemplary execution runtime of the abstract query interface 130 are further described with reference to FIG. 2.

Figure 2A:
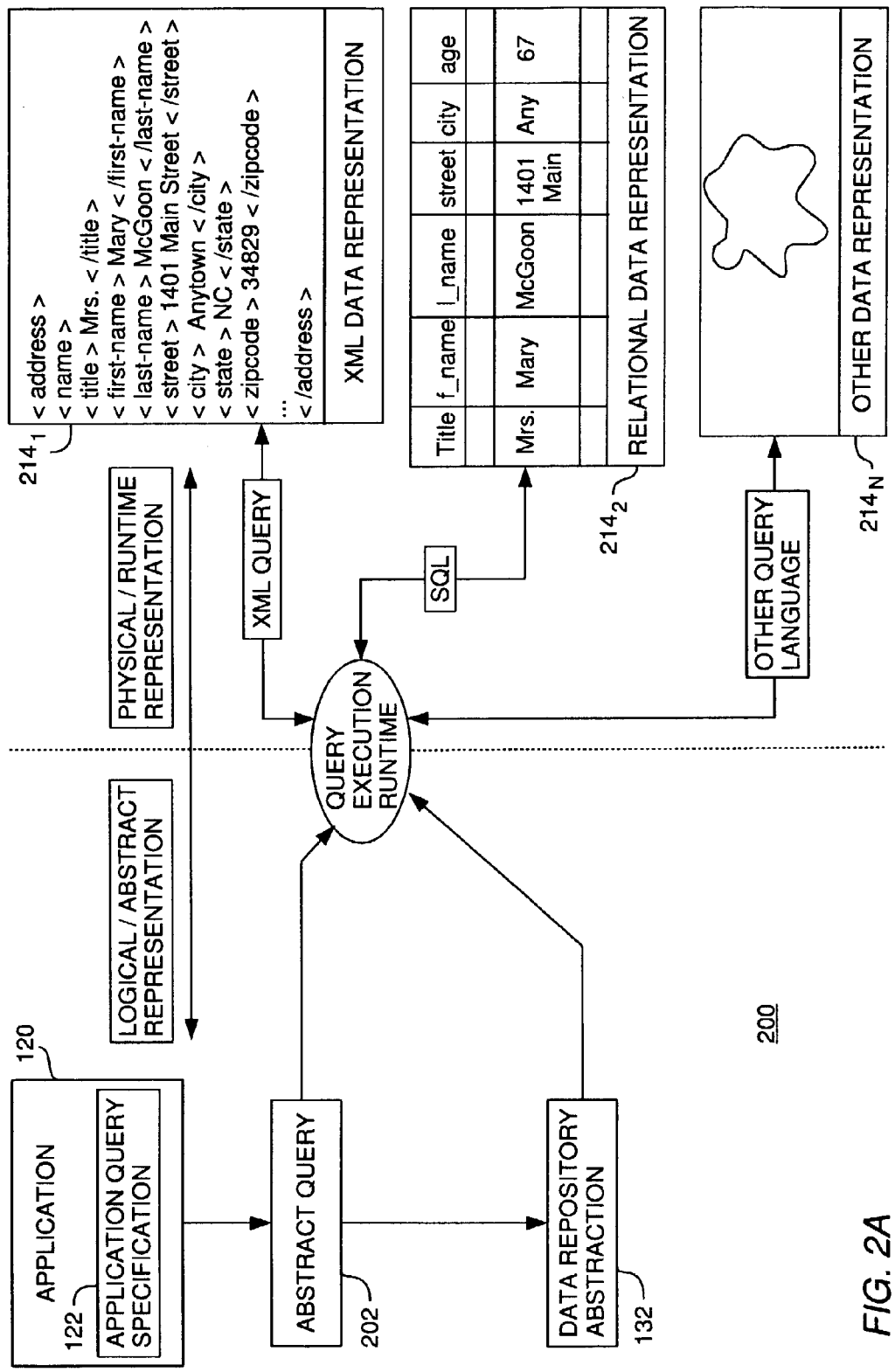
FIGS. 2A–B is a relational view of software components of one embodiment of the invention.
Figure 2B:
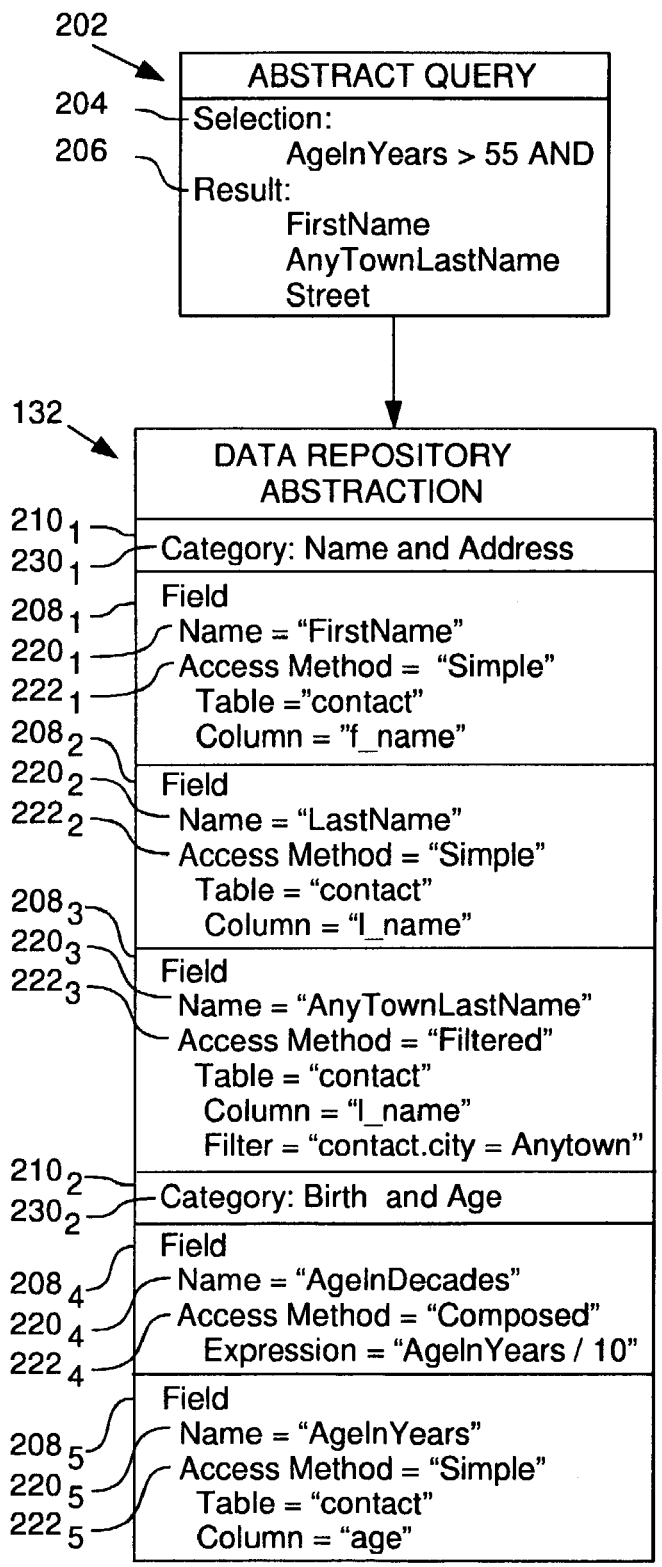

FIGS. 2A–B show an illustrative relational view 200 of components of the invention. The data abstraction model 132 defines logical fields corresponding to physical entities of data in a database (e.g., database 139), thereby providing a logical representation of the data. In a relational database environment having a multiplicity of database tables, a specific logical representation having specific logical fields is provided for each database table. In this case, all specific logical representations together constitute the data abstraction model 132. Each specific logical representation can be generated using the template data abstraction model 152 having template logical fields which generically define the specific logical fields. Generation of specific logical representations using the template data abstraction model 152 is further described with reference to FIGS. 5A–B.

The physical entities of the data are arranged in the database according to a physical representation of the data. Using a logical representation of the data, an application query specification 122 specifies one or more logical fields to compose an abstract query 202. The requesting entity (e.g., one of the applications 120) issues the query 202 as defined by the respective application query specification 122 of the requesting entity.

The resulting query 202 is generally referred to herein as an "abstract query" because the query is composed according to abstract (i.e., logical) fields rather than by direct reference to the underlying physical data entities in the database 139. As a result, abstract queries may be defined that are independent of the particular underlying physical data representation used. In one embodiment, the application query specification 122 may include both criteria used for data selection (selection criteria 204) and an explicit specification of the fields to be returned (return data specification 206) based on the selection criteria 204. For execution, the abstract query 202 is transformed into a query consistent with the underlying physical representation of the data using the data abstraction model 132.

In general, the data abstraction model 132 exposes information as a set of logical fields that may be used within a query (e.g., the abstract query 202) issued by the application 120 to specify criteria for data selection and specify the form of result data returned from a query operation. The logical fields are defined independently of the underlying physical representation being used in the database 139, thereby allowing queries to be formed that are loosely coupled to the underlying physical representation.

In one embodiment, the data abstraction model 132 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification may contain one or more attributes. Illustratively, the field specifications 208 include a logical field name attribute $220_1$, $220_2$, $220_3$, $220_4$, $220_5$ (collectively, field name 220) and an associated access method attribute $222_1$, $222_2$, $222_3$, $222_4$, $222_5$ (collectively, access methods 222). Each attribute may have a value. For example, logical field name attribute $220_1$ has the value "FirstName" and access method attribute $222_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $222_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, groups (i.e. two or more) of logical fields may be part of categories. Accordingly, the data abstraction model 132 includes a plurality of category specifications $210_1$ and $210_2$ (two shown by way of example), collectively referred to as the category specifications. In one embodiment, a category specification is provided for each logical grouping of two or more logical fields. For example, logical fields $208_{1-3}$ and $208_{4-5}$ are part of the category specifications $210_1$ and $210_2$, respectively. A category specification is also referred to herein simply as a "category". The categories are distinguished according to a category name, e.g., category names $230_1$ and $230_2$ (collectively, category name(s) 230). In the present illustration, the logical fields $208_{1-3}$ are part of the "Name and Address" category and logical fields $208_{4-5}$ are part of the "Birth and Age" category.

The access methods generally associate (i.e., map) the logical field names to a data structure $214_1$, $214_2$ ... $214_N$ in the database (e.g., database 139). By way of illustration, two data representations are shown, an XML data representation $214_1$ and a relational data representation $214_2$. However, the physical representation $214_N$ indicates that any other data representation, known or unknown, is contemplated. In one embodiment, a different single data repository abstraction (interchangeably referred to as the data abstraction model) is provided for each separate physical representation 214, as explained above for the case of a relational database environment. In an alternative embodiment, a single data abstraction model 132 contains field specifications (with associated access methods) for two or more physical representations 214.

Any number of access methods is contemplated depending upon the number of different types of logical fields to be supported. In one embodiment, access methods for simple fields, filtered fields and composed fields are provided. The field specifications $208_2$, $208_3$ and $208_7$ exemplify simple field access methods $222_1$, $222_2$, and $222_5$, respectively. Simple fields are mapped directly to a particular entity in the underlying physical representation (e.g., a field mapped to a given database table and column). By way of illustration, as described above, the simple field access method $222_1$ shown in FIG. 2B maps the logical field name $220_1$ ("FirstName") to a column named "f_name" in a table named "contact". The field specification $208_4$ exemplifies a filtered field access method $222_3$. Filtered fields identify an associated physical entity and provide filters used to define a particular subset of items within the physical representation. An example is provided in FIG. 2B in which the filtered field access method $222_4$ maps the logical field name $220_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $208_6$ exemplifies a composed field access method $222_4$. Composed access methods compute a logical field from one or more physical fields using an expression supplied as part of the access method definition. In this way, information which does not exist in the underlying physical data representation may be computed. In the example illustrated in FIG. 2B the composed field access method $222_4$ maps the logical field name $220_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case a conversion of the underlying physical data into the format of the logical field is required.

By way of example, the field specifications 208 of the data abstraction model 132 shown in FIG. 2 are representative of logical fields mapped to data represented in the relational data representation $214_2$. However, other instances of the data repository extraction component 132 map logical fields to other physical representations, such as XML.

An illustrative abstract query corresponding to the abstract query 202 shown in FIG. 2B is shown in Table I below. By way of illustration, the illustrative abstract query is defined using XML. However, any other language may be used to advantage.

TABLE I

ABSTRACT QUERY EXAMPLE

```
001  <?xml version="1.0"?>
002  <!--Query string representation: (AgeInYears> "55"-->
003  <QueryAbstraction>
004    <Selection>
005      <Condition internalID="4">
006        <Condition field="AgeInYears" operator="GT" value="55"
007  internalID="1"/>
008    </Selection>
009    <Results>
010      <Field name="FirstName"/>
011      <Field name="AnyTownLastName"/>
012      <Field name="Street"/>
013    </Results>
014  </QueryAbstraction>
```

Illustratively, the abstract query shown in Table I includes a selection specification (lines 04–008) containing selection criteria and a results specification (lines 009–013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 132 shown in FIG. 2B is shown in Table II below. By way of illustration, the illustrative Data Abstraction Model is defined using XML. However, any other language may be used to advantage.

TABLE II

DATA ABSTRACTION MODEL EXAMPLE

```
001  <?xml version="1.0"?>
002  <DataAbstraction>
003    <Category name="Name and Address">
004      <Field queryable="Yes" name="FirstName" displayable=
             "Yes">
005        <AccessMethod>
006          <Simple columnName="f_name" tableName="contact">
             </Simple>
007        </AccessMethod>
008      </Field>
009      <Field queryable="Yes" name="LastName" displayable=
             "Yes">
010        <AccessMethod>
011          <Simple columnName="l_name" tableName=
               "contact"></Simple>
012        </AccessMethod>
013      </Field>
014      <Field queryable="Yes" name="AnyTownLastName"
             displayable="Yes">
015        <AccessMethod>
016          <Filter columnName="l_name" tableName=
               "contact">
017          </Filter="contact.city=Anytown">
018        </AccessMethod>
019      </Field>
020    </Category>
021    <Category name="Birth and Age">
022      <Field queryable="Yes" name="AgeInDecades"
             displayable="Yes">
023        <AccessMethod>
024          <Composed columnName="age" tableName=
               "contact">
025          </Composed Expression="columnName/10">
026        </AccessMethod>
027      </Field>
028      <Field queryable="Yes" name="AgeInYears" displayable=
             "Yes">
029        <AccessMethod>
030          <Simple columnName="age" tableName="contact">
             </Simple>
031        </AccessMethod>
032      </Field>
033    </Category>
034  </DataAbstraction>
```

Note that lines 004–008 correspond to the first field specification $208_2$ of the DAM 132 shown in FIG. 2B and lines 009–013 correspond to the second field specification $208_3$. For brevity, the other field specifications defined in Table I have not been shown in FIG. 2B.

The illustrative Data Abstraction Model shown in Table II is represented in tabular form in Table III below. For brevity, the access methods 222 have been omitted in this tabular representation. Furthermore, for simplicity, only logical fields with "Simple" access methods are represented, i.e., field specifications $208_2$, $208_3$ and $208_7$.

TABLE III

DAM IN TABULAR FORM

| Logical Field Name | Table Name | Column Name |
|---|---|---|
| Category Name and Address/ Field FirstName | contact | f_name |
| Category Name and Address/ Field LastName | contact | l_name |
| Category Birth and Age/Field AgeInYears | contact | age |

Note that the first column of Table III includes "Logical Field Names" which consist of a combination of a field name and an associated category name (where appropriate) for each represented logical field. The second column in Table III includes a name of a database table, to which the corresponding represented logical field refers and the third column indicates a column in the referred to database table. The tabular form of a data abstraction model will be used below to describe embodiments of the invention.

Figure 3:
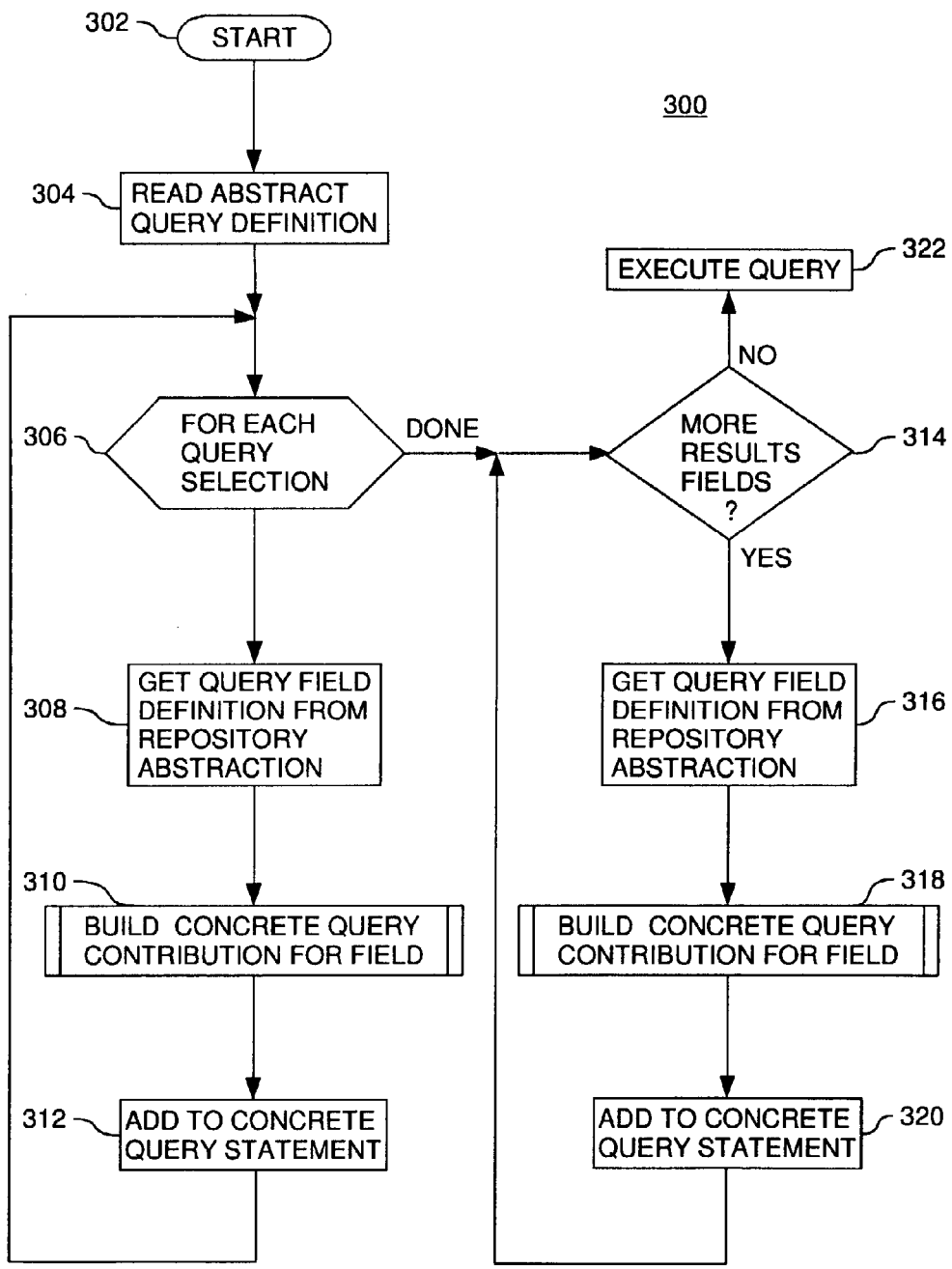
FIGS. 3–4 are flow charts illustrating the operation of a runtime component.

FIG. 3 shows an illustrative runtime method 300 exemplifying one embodiment of the operation of the runtime component 134. The method 300 is entered at step 302 when the runtime component 134 receives as input an instance of an abstract query (such as the abstract query 202 shown in FIG. 2). At step 304, the runtime component 134 reads and parses the instance of the abstract query and locates individual selection criteria and desired result fields. At step 306, the runtime component 134 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 134 uses the field name from a selection criterion of the abstract query to look up the definition of the field in the data abstraction model 132. As noted above, the field definition includes a definition of the access method used to access the physical data associated with the field. The runtime component 134 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 134 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 134 looks up a result field name (from the result specification of the abstract query) in the data abstraction model 132 and then retrieves a Result Field Definition from the data abstraction model 132 to identify the physical location of data to be returned for the current logical result field. The runtime component 134 then builds (at step 318) a Concrete Query Contribution (of the concrete query that identifies physical location of data to be returned) for the logical result field. At step 320, the Concrete Query Contribution is then added to the Concrete Query Statement. Once each of the result specifications in the abstract query has been processed, the query is executed at step 322.

Figure 4:
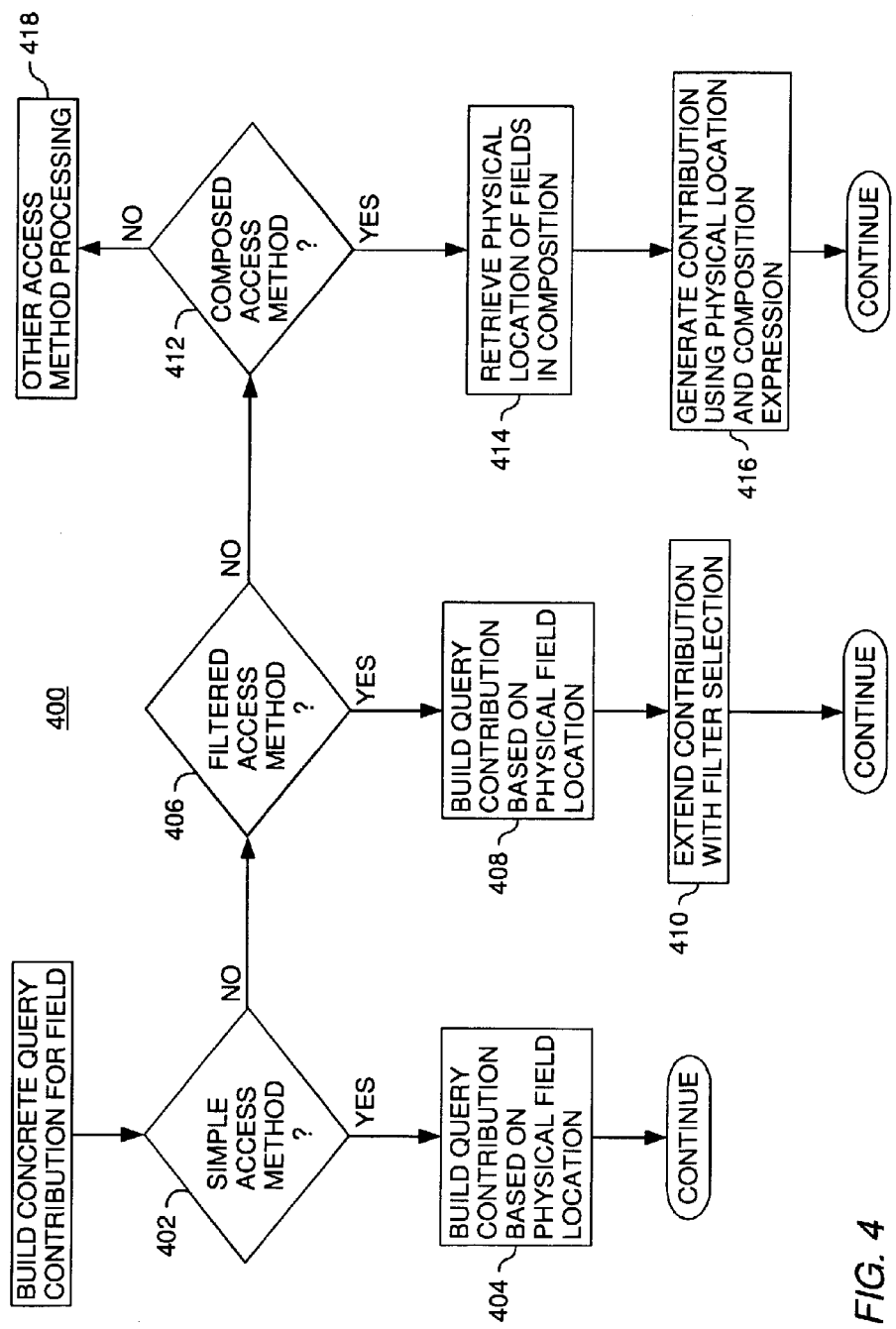

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

According to aspects of the invention, the template processor 150 of FIG. 1 facilitates providing a logical representation for physical data in a database (e.g., database 139 of FIG. 1). In one aspect, a specific logical representation for a data structure in the database is created upon generation of the data structure itself or the physical data of the data structure. According to another aspect, one or more specific logical representations are created at runtime, for instance, when running an abstract query against the database. Creation of a specific logical representation is performed using the template data abstraction model 152. The template data abstraction model 152 includes a plurality of template logical fields, each of which includes generic data location metadata.

In one embodiment, the generic data location metadata generically describes a common data structure in the database. For instance, the generic data location metadata describes generic table and column names which apply to database tables having identical schemas and differing only in the data they contain. Thus, when similar data structures are repeatedly created, generation of a specific logical representation for each newly generated data structure is facilitated. A relational view of software components implementing this embodiment is described below with reference to FIG. 5A. A corresponding illustrative operational flow is described below with reference to FIG. 7.

In another embodiment, the generic data location metadata generically describes similar columns in different database tables. For instance, the generic data location metadata comprises a wildcard to designate similar table or column names. By way of example, if the generic data location metadata is "*1", this indicates that the generic data location metadata points to any column having as name a character string that terminates with a "1", such as "Test1", "Value1" or "Result1". Thus, for example in a frequently modified or updated database, generation of a corresponding logical representation may be performed automatically taking into account any recent changes. Furthermore, in creating a template data abstraction model for one or more existing underlying databases, specific logical representations may be generated for these databases which are related to specific subject matter contained therein. A relational view of software components implementing this embodiment is described below with reference to FIG. 5B. A corresponding exemplary operational flow in one embodiment is described below with reference to FIGS. 8–9.

Figure 5A:
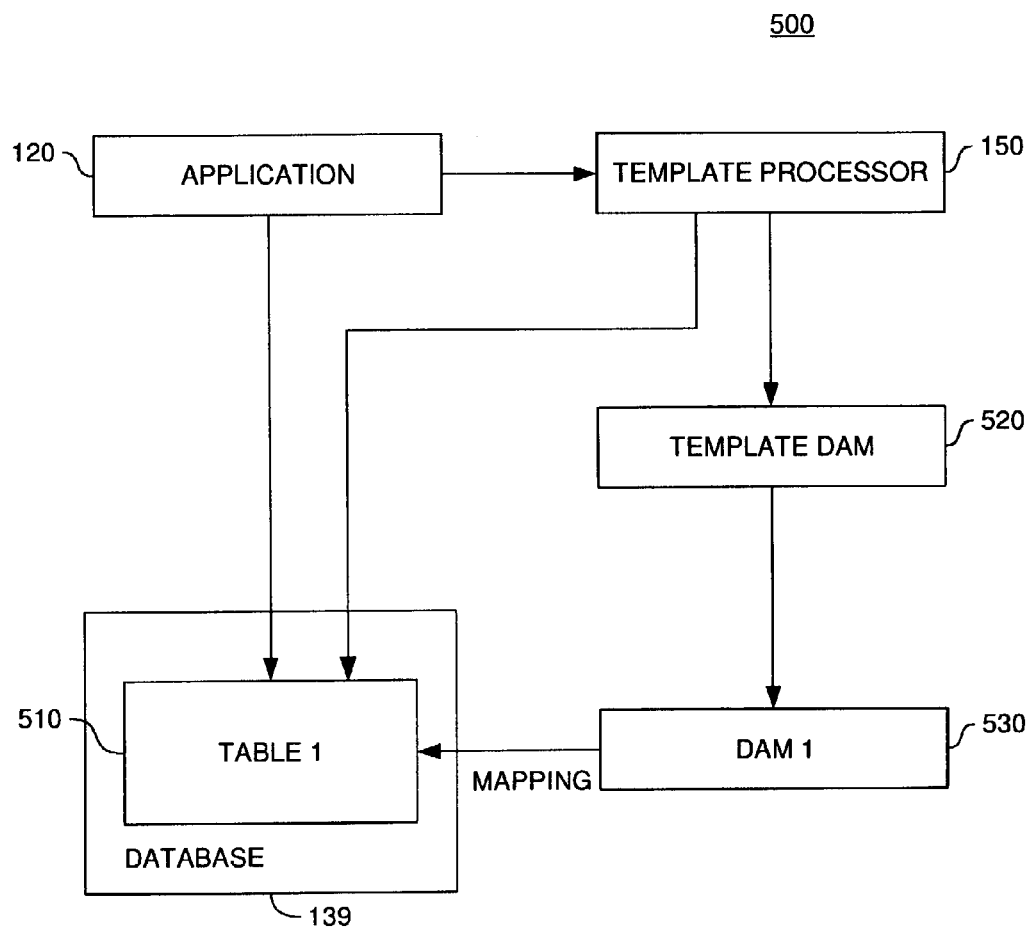
FIGS. 5–6 are relational views of software components of embodiments of the invention.

Referring now to FIG. 5A, an embodiment of a relational view 500 of components of FIG. 1 is shown. The relational view 500 illustrates interaction of the application 120 and the template processor 150 in creation of a new database table 510 "TABLE 1" in the database 139.

According to one aspect, upon creation of the new table 510 "TABLE 1" in the database 139, the application 120 invokes the template processor 150. The template processor 150 retrieves from storage (e.g., main memory 116) a template data abstraction model 520 (e.g., one embodiment of the template data abstraction model 152) which is configured for generation of a specific logical representation, i.e., a specific data abstraction model 530 "DAM 1" for the new database table 510 "TABLE 1". In an alternative embodiment, the specific logical representation may also be created before generation of the new database table 510 "TABLE 1". Such an embodiment presumes that the table and column (in the case of a relational database) naming convention is known, so that the resulting schema of any table is predictable.

Figure 5B:
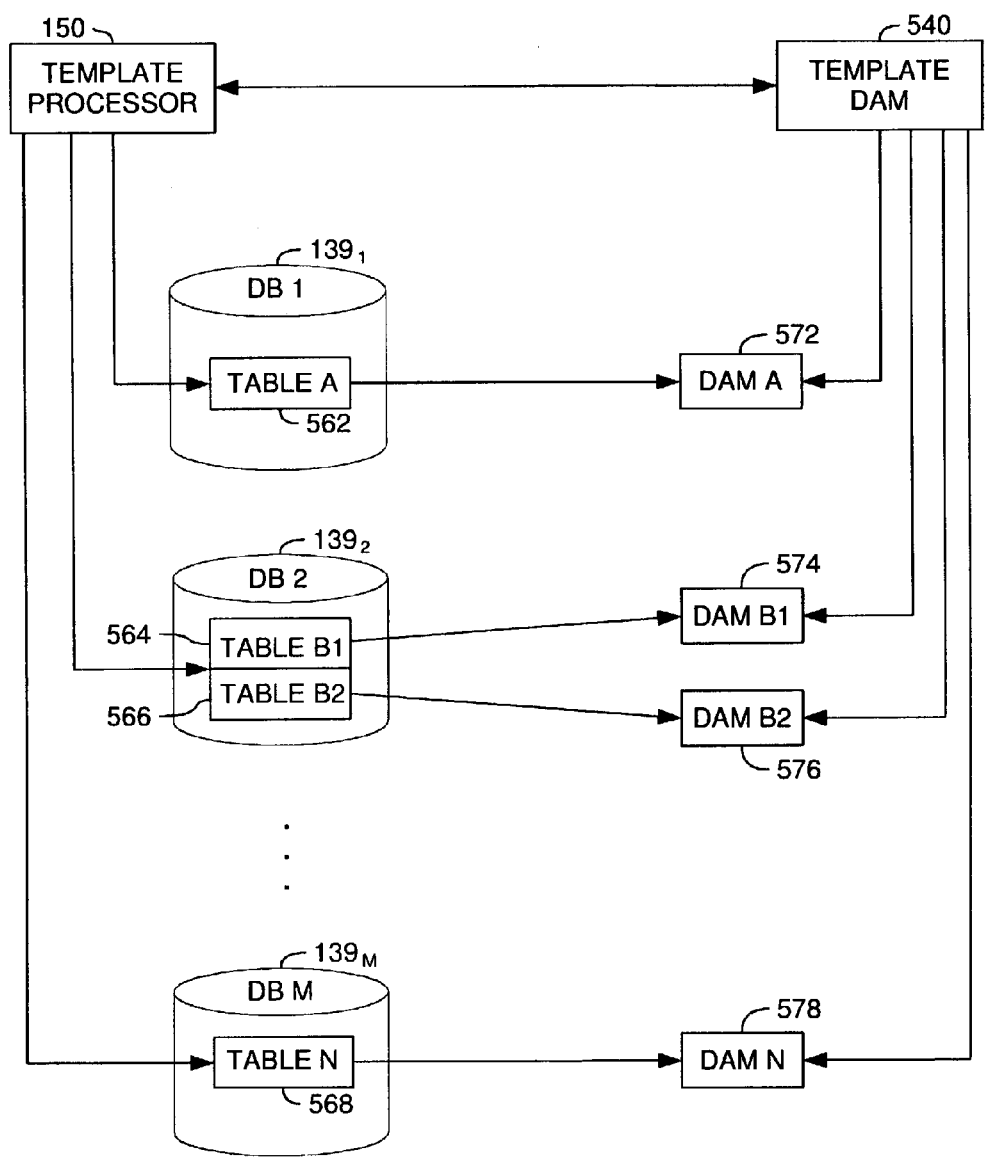

Referring now to FIG. 5B, a relational view 550 of components in another embodiment of the invention is shown. The relational view 550 illustrates operation of the template processor 150 for generation of specific logical representations "DAM A" 572, "DAM B1" 574, "DAM B2" 576 and "DAM N" 578 for existing database tables "TABLE A" 562, "TABLE B1" 564, "TABLE B2" 566, "TABLE N" 568, respectively. To this end, the template processor 150 retrieves a template data abstraction model 540 (e.g., one embodiment of the template data abstraction model 152) from storage (e.g., main memory 116) and applies the retrieved template data abstraction model 540 separately to each available database. Illustratively, the template processor 150 applies the template data abstraction model 540 to databases "DB 1" $139_1$, "DB 2" $139_2$ and "DB M" $139_M$.

More specifically, the template processor 150 applies template logical fields defined by the template data abstraction model 540 to each database table contained in one of the available databases "DB 1" $139_1$, "DB 2" $139_2$ and "DB M" $139_M$. Illustratively, the database "DB 1" 139, contains database table "TABLE A" 562, the database "DB 2" $139_2$ contains the database tables "TABLE B1" 564 and "TABLE B2" 566, and the database "DB M" $139_M$ contains the database table "TABLE N" 568. Accordingly, the template processor 150 applies the template logical fields of the template data abstraction model 540 to each one of the database tables "TABLE A" 562, "TABLE B1" 564, "TABLE B2" 566 and "TABLE N" 568. Thus, the template processor 150 determines which template logical fields generically describe an abstract view of the database tables "TABLE A" 562, "TABLE B1" 564, "TABLE B2" 566 and "TABLE N" 568. The template processor 150 may then use the determined template logical fields to generate specific logical fields defining the specific logical representations "DAM A" 572, "DAM B1" 574, "DAM B2" 576 and "DAM N" 578. This generation is further described below with reference to FIG. 6.

In one embodiment, two or more template data abstraction models may be defined, and the template processor 150 then retrieves the appropriate model to generate a specific instance of a data abstraction model. Such an embodiment may be useful, for example, where multiple databases exist (such as in the environment described with reference to FIG. 5B), and a separate data abstraction model is provided for each database.

Figure 6:
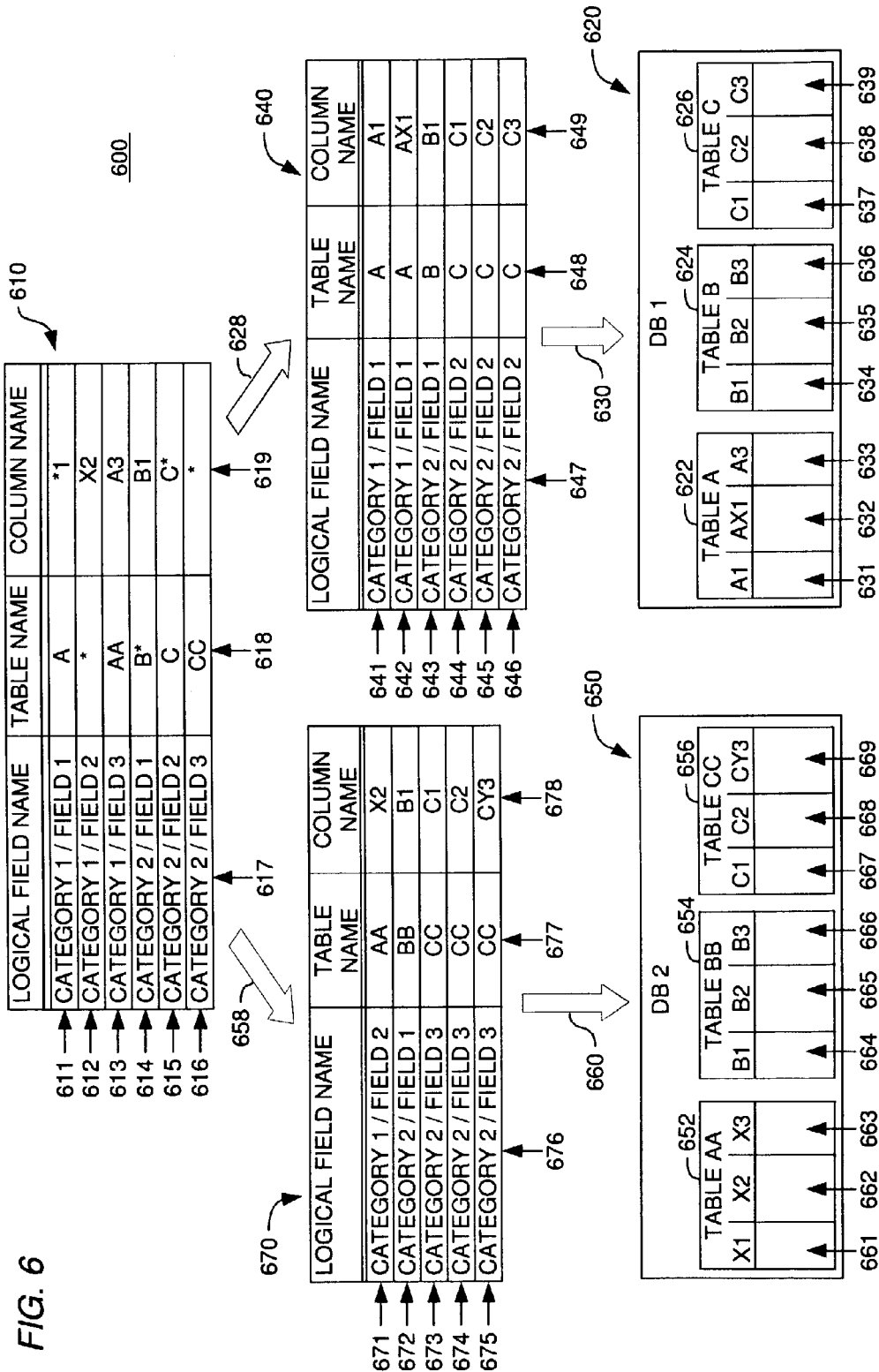

Referring now to FIG. 6, a relational view 600 illustrating generation of two specific logical representations 640 and 670 is shown by way of example. The two specific logical representations 640 and 670 are illustratively generated for two databases 620 and 650, respectively, using a template data abstraction model 610 (e.g., template data abstraction model 540 of FIG. 5B). The template data abstraction model 610 is illustrated in a tabular form having a plurality of rows 611, 612, 613, 614, 615 and 616 and a plurality of columns (illustratively three columns 617, 618 and 619). Each row of the plurality of rows 611, 612, 613, 614, 615 and 616 represents (and is interchangeably referred to as) a template logical field. For simplicity, it is assumed that the template logical fields only include "Simple" access methods. Consequently, the access methods have been omitted for brevity.

The column 617 includes "Logical Field Names" which consist of a combination of a field name and an associated category name (where appropriate) for each represented template logical field. The column 618 includes a name of a database table, to which a corresponding template logical field refers. The column 619 indicates a column in the database table to which the corresponding template logical field refers. An asterisk (*) represents a wildcard character(s) which may taken on any value.

Illustratively, the template logical field 611 has a field name "1" and is part of a category "1". In a given database, the template logical field 611 generically refers in a database table "A" (as specified in the column 618) and to all columns having a character string as name which terminates with "1" (as specified in the column 619), such as "RESULT1". The template logical field 612 has a field name "2" and is also part of the category "1". In a given database, the template logical field 612 generically refers to all database tables (as indicated by the wildcard character "*") having an "X2" column. The template logical field 613 has a field name "3" and is also part of the category "1". In a given database, the template logical field 613 generically refers to a database table "AA" having an "A3" column. The template logical field 614 has a field name "1" and is part of a category "2". In a given database, the template logical field 614 generically refers to all database tables having a character string as name which starts with "B", such as "BIODATA", and further having a "B1" column. The template logical field 615 has a field name "2" and is also part of the category "2". In a given database, the template logical field 615 generically refers in a database table "C" to all columns having a character string as name which starts with "C", such as "COMPUTER". The template logical field 616 has a field name "3" and is also part of the category "2". In a given database, the template logical field 616 generically refers to all columns in a database table "CC".

In the illustrative template data abstraction model 610 some template logical fields in the table name column include explicit table names, such as the first template logical field 611, which specifies a table name "A". Other template logical fields include only the wildcard "*", such as the second template logical field 612). Still others include a combination, such as the fourth template logical field 614, which specifies a table name "B*"). It is also contemplated that a template data abstraction model may be defined with wildcard characters in each table name field, such as where a given table is repeatedly generated with the same columns and a different table name and data.

As shown with arrow 630, the template data abstraction model 610 is applied to the database "DB 1" 620. The database 620 illustratively contains three database tables "TABLE A" 622, "TABLE B" 624 and "TABLE C" 626. By way of example, the database table "TABLE A" 622 includes three columns, namely column "A1" 631, column "AX1" 632 and column "A3" 633. The database table "TABLE B" 624 also includes three columns, namely column "B1" 634, column "B2" 635 and column "B3" 636. The database table "TABLE C" 626 also includes three columns, namely column 637 "C1", column 638 "C2" and column "C3" 639. Application of the template data abstraction model 610 to the database 620 results in the specific logical representation 640, as indicated by arrow 628.

The specific logical representation 640 is represented in a tabular form having a plurality of rows 641, 642, 643, 644, 645 and 646 and a plurality of columns (illustratively three columns 647, 648 and 649). Each row of the plurality of rows 641, 642, 643, 644, 645 and 646 represents (and is interchangeably referred to as) a specific logical field. Each specific logical field 641, 642, 643, 644, 645 and 646 is obtained by application of one of the template logical fields 611, 612, 613, 614, 615 and 616 to one or more of the database tables 622, 624 and 626 in the database "DB1" 620. By way of example, application of the template logical field 611 to the database tables 622, 624 and 626 in the database "DB1" 620 results in the specific logical fields 641 and 642 and application of the template logical field 614 to the database tables 622, 624 and 626 results in the specific logical field 643. The overall structure of the specific logical representation 640 corresponds to the structure of the template data abstraction model 610. Accordingly, a more detailed description thereof is omitted for brevity.

As shown with arrow 660, the template data abstraction model 610 is applied to the database 650 "DB 2". The database 650 illustratively contains three database tables 652 "TABLE AA", 654 "TABLE BB" and 656 "TABLE CC". By way of example, the database table 652 "TABLE AA" includes three columns, namely column 661 "X1", column 662 "X2" and column 663 "X3". The database table 654 "TABLE BB" also includes three columns, namely column 664 "B1", column 665 "B2" and column 666 "B3". The database table 656 "TABLE CC" also includes three columns, namely column 667 "C1", column 668 "C2" and column 669 "C3". Application of the template data abstraction model 610 to the database 650 results in the specific logical representation 670, as indicated by arrow 658.

The specific logical representation 670 is also represented in a tabular form having a plurality of rows 671, 672, 673, 674 and 675 and a plurality of columns (illustratively three columns 676, 677 and 678). For a more detailed explanation of the specific logical representation 670, reference is made to the above detailed description of the specific logical representation 640.

Figure 7:
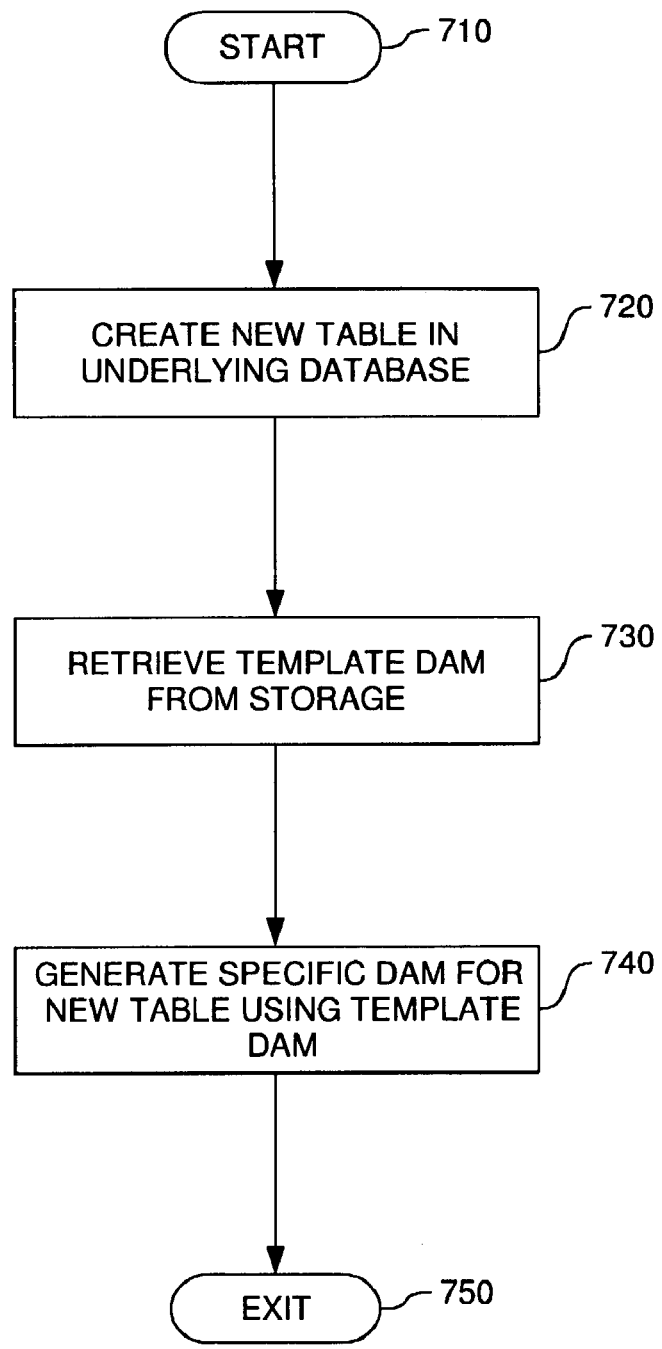
FIG. 7 is a flow chart illustrating application of a template data abstraction model in one embodiment.

Referring now to FIG. 7, one embodiment of a method 700 for creating a specific logical representation (e.g., data repository abstraction 530 of FIG. 5A) using a template data abstraction model (e.g., template data abstraction model 520 of FIG. 5A) is shown. In one embodiment, the method 700 is performed by a template processor (e.g., template processor 150 of FIG. 1). Alternatively, the method 700 may be performed by a DBMS running a process that implements the function of the template processor.

The method 700 starts at step 710 when an application (e.g., application 120 of FIG. 1) is run in the computer system 110. The application produces physical data which is to be stored in storage (e.g. storage 138 of FIG. 1). More specifically, the application produces physical data for which a new database table (e.g., database table 510 of FIG. 5A) needs to be created in a database (e.g., database 139 of FIG. 5A). At step 720, the new database table is created for the physical data in the underlying database.

At step 730, the template data abstraction model is retrieved from storage. The template data abstraction model generically describes data location metadata which generically indicates a location of the new database table and, thus, of the produced physical data in the database. At step 740, the template data abstraction model is used to generate a specific logical representation for the new database table. To this end, the application provides specific data location metadata indicating the name and location of the new database table in the database. Alternatively, at least part of the specific data location metadata or at least part thereof, such as the name of the new database table, may alternatively be provided by a user. The specific data location metadata is then used to generate the specific logical representation from the template data abstraction model. Method 700 then exits at step 750.

It should be noted, that the method 700 merely represents an illustrative embodiment of a method for creating a specific logical representation using a template data abstraction model. However, any implementation resulting in the creation of such a specific logical representation is contemplated. For instance, the method 700 may be modified such that the specific logical representation is generated before the physical data and the new database table are actually created.

Figure 8:
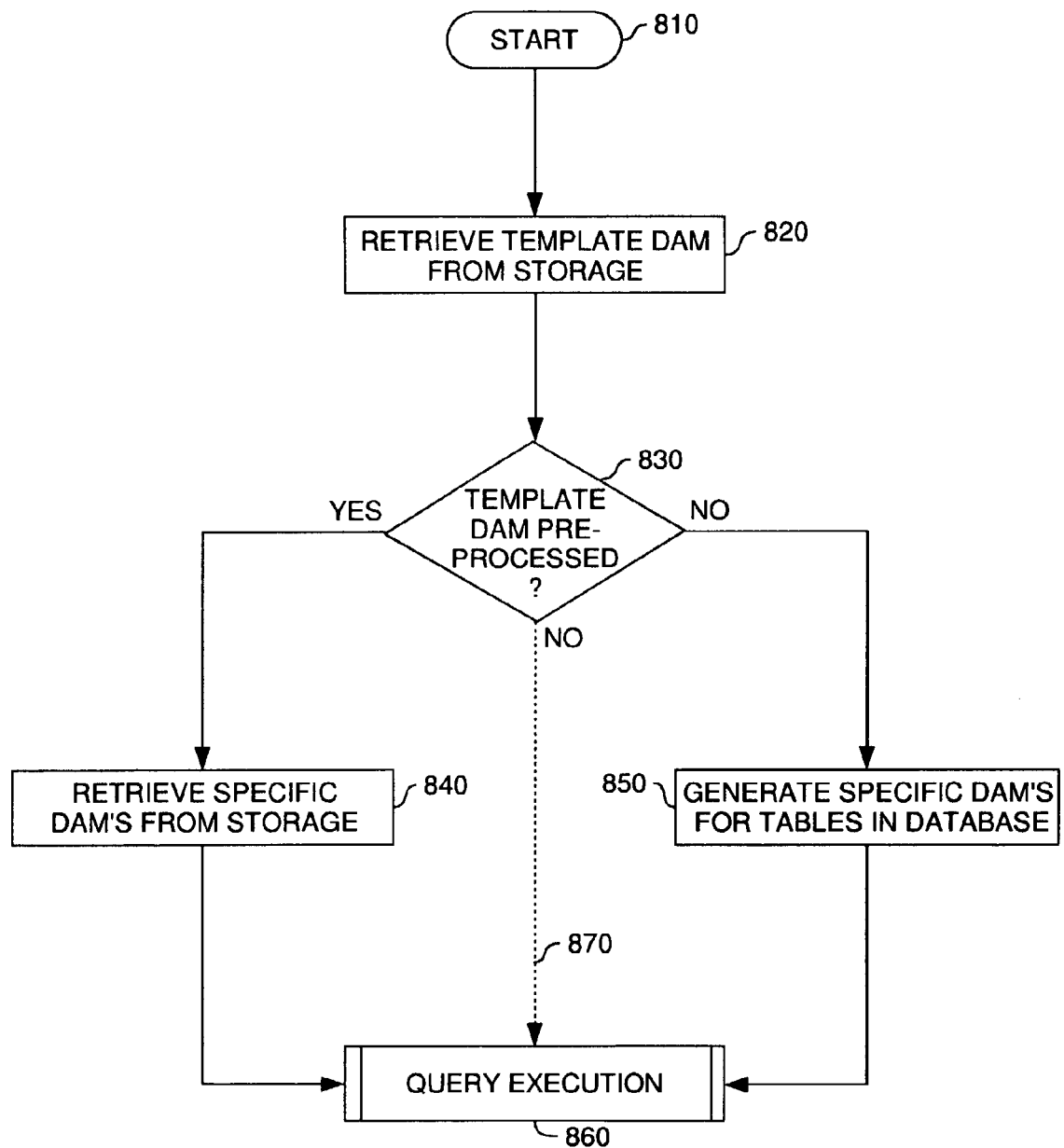
FIGS. 8–9 are flow charts illustrating query execution in one embodiment of the invention.
Figure 9:
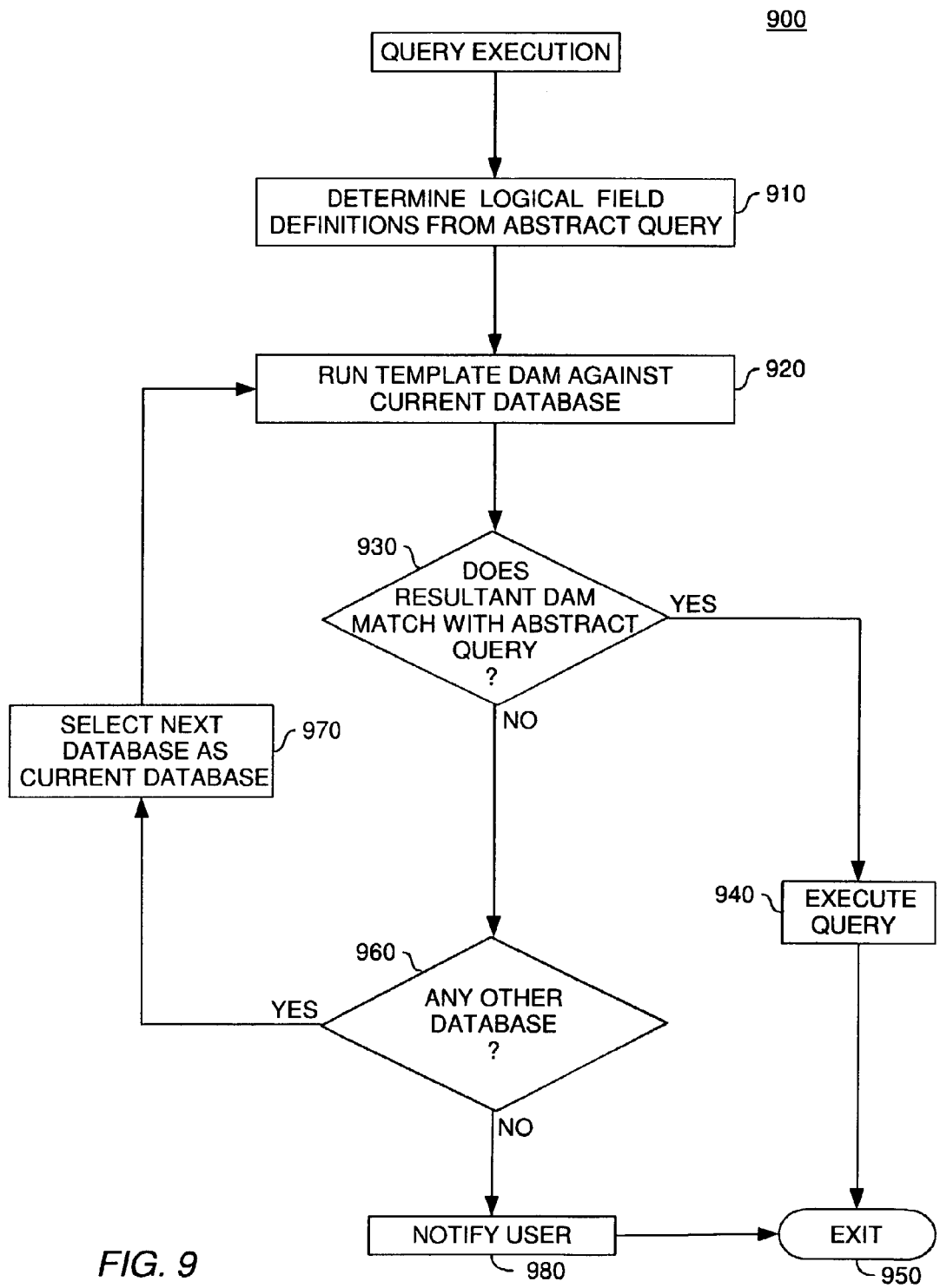

Referring now to FIGS. 8 and 9, one embodiment of a method 800 and 900 for running an abstract query (e.g. abstract query 202 of FIG. 2) against a database (e.g., database 139 of FIG. 1) using a template data abstraction model (e.g., template data abstraction model 540 of FIG. 5B) is shown. The method 800 starts at step 810, when an abstract query is issued against the database.

In one embodiment, a template processor (e.g., template processor 150 of FIG. 1) receives the abstract query and retrieves the template data abstraction model from storage. At step 830, the template processor determines whether the template data abstraction model was pre-processed. In this context pre-processed means that the template data abstraction model was previously used for generation of specific logical representations.

If it is determined at step 830 that the template data abstraction model was pre-processed, the template processor retrieves at step 840 the previously generated specific logical representations from storage. If it is determined at step 830 that the template data abstraction model was not pre-processed, the template processor uses the template data abstraction model to generate the specific logical representations. In both cases processing continues at step 860, where the abstract query is further processed, as will be described with reference to FIG. 9.

Alternatively, as indicated by arrow 870, the method 800 may continue at step 860 without generating the specific logic representations at step 850, if it is determined at step 830 that the template data abstraction model was not preprocessed. In this case, processing of the template data abstraction model is deferred until query execution runtime.

Referring now to FIG. 9, a method 900 for further processing of the abstract query according to step 860 of FIG. 8 is described. At step 910, logical field definitions defining the abstract query are located and determined. Thus, database tables and corresponding columns in these database tables which are accessed by the abstract query can be identified.

At step 920, the template processor or any other suitable comparison logic accesses the template data abstraction model and a current database (e.g., database $139_1$ of FIG. 5B). The template processor generates a specific logical representation for each database table (e.g., database table 562 of FIG. 5B) of the current database. This generation may be performed according to method 700 described above with reference to FIG. 7.

At step 930, the template processor determines whether at least one of the generated specific logical representations contains a plurality of logical fields that includes the logical field definitions of the abstract query. More specifically, at step 930 the template processor determines whether the current database is suitable to satisfy the abstract query. In other words, the template processor determines whether the current database contains a collection of physical data that satisfies the abstract query. If it is determined at step 930 that the current database is suitable to satisfy the abstract query, the abstract query is executed against the current database at step 940. Execution of the abstract query against the database is described in more detail above with reference to FIGS. 3 and 4. The method 900 then exits at step 950.

If it is determined at step 930 that the current database is not suitable to satisfy the abstract query, the template processor determines at step 960 whether the template data abstraction model may be applied to any other available database. If any other database is available, the next database is selected as the current database at step 970 and processing returns to step 920.

In one embodiment, determining whether the current database is suitable for execution of the abstract query is performed by selecting, on the basis of the plurality of logical field definitions of the abstract query, a specific logical representation from two or more provided specific logical representations. The two or more specific logical representations can be provided by pre-processing the template data abstraction model or they may be generated at step 920.

If no other database is available, processing continues at step 980. At step 980 it is assumed that no database is available that satisfies the abstract query. Therefore, a user or operator, which may be a database administrator, is notified accordingly. The method 900 then exits at step 950.

It is noted the above embodiments are merely illustrative and the invention admits of many other embodiments, as will be recognized by those skilled in the art. For example, in one embodiment dynamic mapping may be applied where multiple data stores exist and logic exists to match a logical representation (in the form of the template DAM) with the data store data is retrieved from. For instance, consider a company that has a data warehouse covering about 90% of the information used in user queries. Assume the company also has a production environment that has other information in addition to some of the information included in the warehouse data store. During query generation of a specific user query, if the columns included in tables of the data warehouse do not satisfy the fields to be queried (i.e., the template DAM does not match the data warehouse), the production data source will be queried instead. If, however, the logical representation provided by the template DAM satisfies the user's query, the data from the warehouse database will be used.

In various embodiments, the invention provides numerous advantages over the prior art, some which are now described. However, the following are merely illustrative of advantages that may be achieved by some embodiments of the invention and are, therefore, not limiting of the invention generally. In particular, the invention is not be characterized, or limited in any way limited, by any advantages described herein.

In one aspect, advantages are achieved by defining a loose coupling between the application query specification and the underlying physical representation. Rather than encoding an application with specific table, column and relationship information, as is the case where SQL is used, the application defines data query requirements in a more abstract fashion that are then bound to a physical representation at runtime. The loose query-data coupling of the present invention enables requesting entities (e.g., applications) to function even if the underlying data representation is modified or if the requesting entity is to be used with a completely new physical representation than that used when the requesting entity was developed. In the case where a given physical representation is modified or restructured, the corresponding data repository abstraction is updated to reflect changes made to the underlying physical data model. In contrast, in the case where a given logical representation is modified or restructured, the corresponding physical representation may be updated to reflect changes made to the logical representation. The same set of logical fields is available for use by queries, and has merely been bound to different entities or locations in physical data model. As a result, requesting entities written to the abstract query interface continue to function unchanged, even though the corresponding physical data model has undergone significant change. In the event a requesting entity is to be used with a completely new physical representation than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical representation with the provision of an alternate data repository abstraction which maps fields referenced in the query with the location and physical representation in the new physical data model. Specifically, maintenance of database schemas is simplified as logical representations may be maintained instead of physical representations, thereby improving ease-of-use of complicated database schemas.

In another aspect, the invention facilitates ease-of-use for the application builder and the end-user. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

It should be noted that any reference herein to particular values, definitions, programming languages and examples is merely for purposes of illustration. Accordingly, the invention is not limited by any particular illustrations and examples. Further, while aspects of the invention are described with reference to SELECTION operations, other input/output operation are contemplated, including well-known operations such as ADD, MODIFY, INSERT, DELETE and the like. Of course, certain access methods may place restrictions on the type of abstract query functions that can be defined using fields that utilize that particular access method. For example, fields involving composed access methods are not viable targets of MODIFY, INSERT and DELETE.

While the foregoing is directed to embodiments of the present invention, other and further embodiments of the invention may be devised without departing from the basic scope thereof, and the scope thereof is determined by the claims that follow.

What is claimed is:

1. A computer-implemented method of generating a logical representation of physical data in one or more databases, comprising:
   providing a template data abstraction model defining template logical fields, wherein the template data abstraction model defines a generic abstract view of data; and
   programmatically generating, on the basis of the template data abstraction model, a plurality of logical representations of the physical data, each logical representation defining a plurality of logical fields providing an abstract view of different portions of the physical data and adapted for transforming logical fields of abstract queries into a form consistent with the physical data In the one or more database.

2. The method of claim 1, wherein generating the template data abstraction model comprises:
   determining, from a physical representation of the physical data, one or more sets of similar data structures of the one or more databases; and
   creating a template logic field for each set of the one or more determined sets of similar data structures.

3. The method of claim 1, wherein each template logical field comprises generic data location metadata; and wherein providing the logical representation comprises, for each template logical field:
   determining whether particular physical data of the database satisfies the generic data location metadata of the template logical field; and
   if so, creating a corresponding one of the plurality of logical fields with specific data location metadata mapping the corresponding one logical field to particular physical data of the one or more databases.

4. The method of claim 1, wherein providing the logical representation is done prior to issuing an abstract query against the physical data in the one or more databases.

5. The method of claim 1, wherein providing the logical representation is done at runtime when issuing an abstract query against the physical data in the one or more databases.

6. The method of claim 1, wherein the physical representation is one of a relational, a hierarchical and an XML database schema.

7. A method of generating a relationship between a logical representation of physical data in a database and a physical representation of the physical data, the method comprising:
   providing a plurality of databases, each database having an associated plurality of database data structures;
   providing a template data abstraction model defining template logical fields, each template logical field defining a generic abstract view of a set of similar database data structures;
   receiving an abstract query having a plurality of query logical fields, each query logical field being generically defined by one of the template logical fields; and
   for each database of the plurality of databases:
     determining whether the associated plurality of database data structures of the database includes all database data structures needed to satisfy the abstract query; and
     if it is determined that the associated plurality of database data structures of the database includes all database data structures needed to satisfy the abstract query, generating the logical representation for the physical data using the template data abstraction model, the logical representation defining a plurality of logical fields providing an abstract view of the physical data and adapted for transforming the query logical fields into a form consistent with the physical data in the database.

8. The method of claim 7, further comprising, if it is determined that the associated plurality of database data structures of the plurality of databases does not include database data structures needed to satisfy the abstract query:
   notifying an operator that the abstract query cannot be processed.

9. The method of claim 7, wherein the physical representation is one of a relational, a hierarchical and an XML database schema.

10. A method of providing access to physical data in a database having a particular physical data representation, comprising:
    providing two or more logical representations, each logical representation defining a plurality of logical fields collectively providing a separate abstract view of at least one portion of the physical data;
    receiving an abstract query from the requesting entity, wherein the abstract query comprises references to a plurality of logical fields defined in at least one of the logical representations; and
    selecting, on the basis of the plurality of logical fields referenced in the abstract query, one of the two or more logical representations to use in transforming the abstract query into a form consistent with the at least one portion of the physical data.

11. The method of claim 10, wherein selecting the one logical representation comprises:
for each logical representation of the two or more logical representations:
comparing the plurality of logical fields defined in the logical representation with the plurality of logical fields referenced in the abstract query; and
if the plurality of logical fields defined in the logical representation includes the plurality of logical field referenced in the abstract query, using the logical representation for transforming the abstract query into the form consistent with the at least one portion of the physical data.

12. The method of claim 11, wherein using the one logical representation comprises using the plurality of logical fields defined in the one logical representation for transforming the plurality of logical field referenced in the abstract query into the form consistent with the at least one portion of the physical data.

13. The method of claim 10, wherein providing two or more logical representations comprises:
providing a template data abstraction model defining template logical fields; and
providing, on the basis of the template data abstraction model, the two or more logical representations.

14. The method of claim 13, wherein each template logical field comprises generic data location metadata; and wherein providing the two or more logical representations comprises, for each template logical field:
determining whether particular physical data of the database satisfies the generic data location metadata of the template logical field; and
if so, creating a corresponding one of the plurality of logical fields with specific data location metadata mapping the corresponding one logical field to the particular physical data of the database.

15. A computer readable storage medium containing a program which, when executed, performs an operation of generating a logical representation of physical data in one or more databases, the operation comprising:
retrieving a template data abstraction model defining template logical fields, wherein the template data abstraction model defines a generic abstract view of data; and
generating, on the basis of the template data abstraction model, a plurality of logical representations of the physical data, each logical representation defining a plurality of logical fields providing a separate abstract view of different portions of the physical data and adapted for transforming logical fields of abstract queries into a form consistent with the physical data in the one or more databases.

16. The computer readable storage medium of claim 15, wherein each template logical field comprises generic data location metadata; and wherein generating the logical representation comprises, for each template logical field:
determining, from a physical representation of the physical data, one or more sets of similar data structures of the one or more databases: and
creating a template logic field for each set of the one or more determined sets of similar data structures.

17. The computer readable storage medium of claim 15, wherein generating the logical representation is done prior to issuing an abstract query against the physical data in the one or more databases.

18. The computer readable storage medium of claim 15, wherein generating the logical representation is done at runtime when issuing an abstract query against the physical data in the one or more databases.

19. The computer readable storage medium of claim 15, wherein the physical representation is one of a relational, a hierarchical and an XML database scheme.

20. A computer readable storage medium containing a program which, when executed, performs an operation of generating a relationship between a logical representation of physical data in a database and a physical representation of the physical data, the operation comprising:
retrieving a plurality of databases, each database having an associated plurality of database data structures;
retrieving a template data abstraction model defining template logical fields, each template logical field defining a generic abstract view of a set of similar database data structures;
receiving an abstract query having a plurality of query logical fields, each query logical field being generically defined by one of the template logical fields; and
for each database of the plurality of databases:
determining whether the associated plurality of database data structures of the database includes all database data structures needed to satisfy the abstract query; and
if it is determined that the associated plurality of database data structures of the database includes all database data structures needed to satisfy the abstract query, using the template data abstraction model to generate the logical representation for the physical data, the logical representation defining a plurality of logical fields providing an abstract view of the physical data and adapted for transforming the query logical fields into a form consistent with the physical data in the database.

21. The computer readable storage medium of claim 20, further comprising, if it is determined that the associated plurality of database data structures of any one of the plurality of databases does not include all query data structures:
notifying an operator that the abstract query cannot be processed.

22. The computer readable storaae medium of claim 20, wherein the physical representation is one of a relational, a hierarchical and an XML database schema.

23. A computer readable storage medium containing a program which, when executed, performs an operation of providing access to physical data in a database having a particular physical data representation, the operation comprising:
retrieving two or more logical representations, each logical representation defining a plurality of logical fields collectively providing a separate abstract view of at least one portion of the physical data;
receiving an abstract query from the requesting entity, wherein the abstract query comprises references fo a plurality of logical fields defined in at least one of the logical representations; and
selecting, on the basis of the plurality of logical fields referenced in the abstract query, one of the two or more logical representations to use in transforming the abstract query into a form consistent with the at least one portion of the physical data.

24. The computer readable storage medium of claim 23, wherein selecting the one logical representation comprises:
for each logical representation of the two or more logical representations:

comparing the plurality of logical fields defined in the logical representation with the plurality of logical fields referenced in the abstract query; and if the plurality of logical fields defined in the logical representation includes the plurality of logical field referenced in the abstract query, using the logical representation for transforming the abstract query into the form consistent with the at least one portion of the physical data.

25. The computer readable storage medium of claim 24, wherein using the one logical representation comprises using the plurality of logical fields defined in the one logical representation for transforming the plurality of logical field referenced in the abstract query into the form consistent with the at least one portion of the physical data.

26. The computer readable storage medium of claim 23, wherein retrieving two or more logical representations comprises:

retrieving a template data abstraction model defining template logical fields; and generating, on the basis of the template data abstraction model, the two or more logical representations.

27. The computer readable storage medium of claim 26, wherein each template logical field comprises generic data location metadata; and wherein generating the two or more logical representations comprises, for each template logical field:

determining whether particular physical data of the database satisfies the generic data location metadata of the template logical field; and if so, creating a corresponding one of the plurality of logical fields with specific data location metadata mapping the corresponding one logical field to the particular physical data of the database.

28. A computer, comprising:

a database for storing data; and a template processor configured for generating a logical representation of physical data in a database, the generating comprising:

retrieving a template data abstraction model defining template logical fields; and generating, on the basis of the template data abstraction model, the logical representation of the physical data, the logical representation defining a plurality of logical fields providing an abstract view of the physical data and adapted for transforming logical fields of abstract queries Into a form consistent with the physical data in the database.

29. A computer, comprising:

a database for storing data; and a template processor configured for generating a relationship between a logical representation of physical data in a database and a physical representation of the physical data, the generating comprising:

retrieving a plurality of databases, each database having an associated plurality of database data structures;

retrieving a template data abstraction model defining template logical fields, each template logical field defining a generic abstract view of a set of similar database data structures;

receiving an abstract query against physical data included in one or more of the plurality of databases, the abstract query having a plurality of query logical fields for corresponding query data structures, each query logical field being generically defined by one of the template logical fields; and for each database of the plurality of databases:

determining whether the associated plurality of database data structures of the database includes all query data structures; and if it is determined that the associated plurality of database data structures of the database includes all query data structures, generating the logical representation for the physical data using the template data abstraction model, the logical representation defining a plurality of logical fields providing an abstract view of the physical data and adapted for transforming the query logical fields into a form consistent with the physical data in the database.

30. A computer, comprising:

a database for storing data; and a processor configured for performing an operation of providing access to physical data in a database having a particular physical data representation, the operation comprising:

retrieving two or more logical representations, each logical representation defining a plurality of logical fields collectively providing a separate abstract view of at least one portion of the physical data;

receiving an abstract query from the requesting entity, wherein the abstract query comprises references to a plurality of logical fields defined in at least one of the logical representations; and selecting, on the basis of the plurality of logical fields referenced in the abstract query, one of the two or more logical representations to use in transforming the abstract query into a form consistent with the at least one portion of the physical data.

31. A data structure residing in memory and comprising:

a template data abstraction model being configured for generation of a logical representation for at least one portion of physical data in a database, the logical representation defining a plurality of logical fields providing an abstract view of the at least one portion of the physical data and adapted for transformation of logical fields of abstract queries into a form consistent with the at least one portion of the physical data in the database, the template data abstraction model including:

a plurality of template logical fields defining a generic abstract view of the physical data in the database, each template logical field having generic data location metadata for generically representing a relationship between a specific logical field of the plurality of logical fields and a corresponding specific physical data item in the database.

32. The method of claim 1, wherein the plurality of logical field definitions in the logical representations each comprise a logical field name, at least one location attribute identifying a location of physical data corresponding to the logical field name, and a reference to an access method selected from at least two different access method types; wherein each of the different access methods types defines a different manner of exposing the physical data corresponding to the logical field name of the respective logical field definition.

* * * * *